Sept. 6, 1955  J. W. SHEEHAN  2,717,138
HYDRAULIC CAMERA MOUNT
Filed April 22, 1954  2 Sheets-Sheet 1

JAMES W. SHEEHAN,
INVENTOR.

BY *Lyon & Lyon*
ATTORNEYS

Sept. 6, 1955 J. W. SHEEHAN 2,717,138
HYDRAULIC CAMERA MOUNT
Filed April 22, 1954 2 Sheets-Sheet 2

JAMES W. SHEEHAN,
INVENTOR.

BY Lyon & Lyon
ATTORNEYS

United States Patent Office 2,717,138
Patented Sept. 6, 1955

2,717,138

HYDRAULIC CAMERA MOUNT

James W. Sheehan, Pacific Palisades, Calif., assignor to Arcturus Manufacturing Corporation, Venice, Calif., a corporation of California Application April 22, 1954, Serial No. 424,879

3 Claims. (Cl. 248—183)

The present invention relates to improved means or techniques whereby a device or instrument such as, for example, a camera may be moved positively, but smoothly in both the azimuth plane and the elevation plane.

The present invention is admirably suited for mounting a movie type of camera on a suitable support such as, for example, a tripod. Using this mount, the taking of satisfactory pictures is more assured in that continuous smooth movement of the camera when moved in either the azimuth or elevation planes is assured, thereby avoiding "jerkiness" in the subsequently projected picture.

A feature of the present invention is that the degree of movement of the camera on the mount is not critical with respect to the manual force applied in orienting the camera. To accomplish this feature a pair of hydraulic cylinders are provided, one applicable for movement in the horizontal or azimuthal plane and the other applicable for movement in the vertical or elevation plane. Manually adjustable valve elements are associated with each of such cylinders for metering the movement of liquid from one portion of the corresponding cylinder to the other portion of the cylinder. Also, the valve element is movable to a position wherein it is effective to lock the camera in an adjusted position wherein it is prevented from moving either in the horizontal or vertical planes as the case may be.

An object of the present invention is, therefore, to provide improved mounting structure of the character indicated above.

A specific object of the present invention is to provide an improved camera mount adapted to move a camera thereon in both a horizontal plane and a vertical plane, the camera incorporating adjustable hydraulic means for controlling the movement of the camera independently in both the horizontal and vertical planes.

Another object of the present invention is to provide an improved camera mount in which a singly manually adjustable element serves not only as a valve element for controlling the rate of movement, but also as a locking element for locking the valve in an adjusted position.

Another object of the present invention is to provide an improved camera mount which is relatively inexpensive and one which is rugged and substantially fool proof in its operation.

Another object of the present invention is to provide an improved camera mount for orienting the camera in both the horizontal and vertical planes such that excessive manual force applied producing such movement is ineffective to cause "jerkiness" of movement, but on the other hand results in a smooth continuous movement whereby jerkiness in the subsequently projected picture is not observable.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
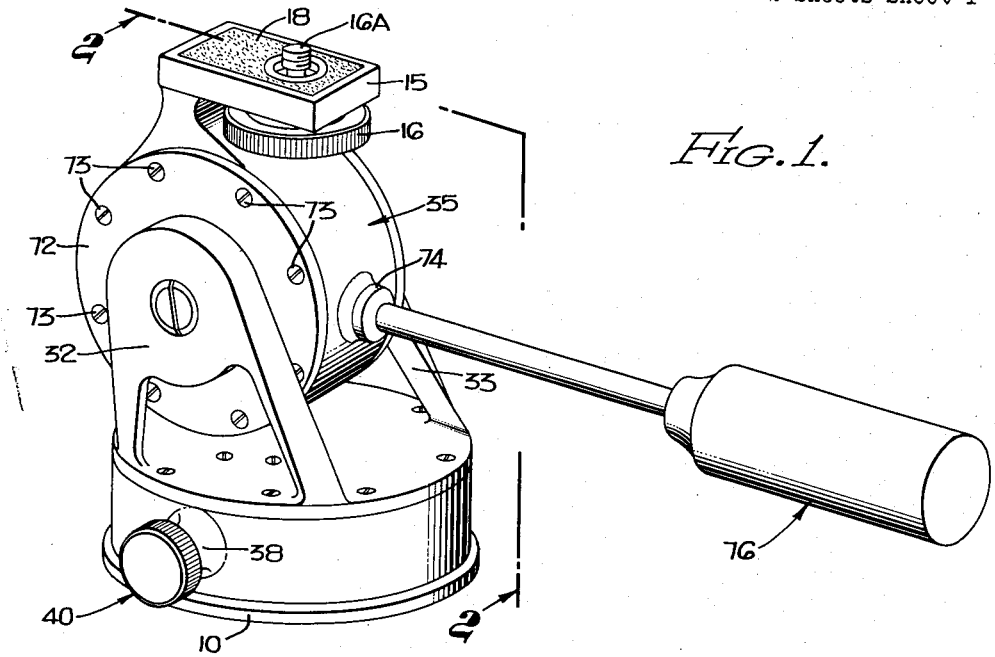
Figure 1 is a perspective view showing a camera mount embodying the features of the present invention.

The camera mount is intended to be mounted on a suitable support such as a tripod and for that purpose there is provided a base 10 to which is secured the centrally disposed bearing member 11, such bearing member 11 being centrally tapped to provide the tapped aperture portion 12 adapted to receive the conventionally captivated fastening screw of the tripod mount. A resilient disc 13 is recessed in the base 10 for providing friction between the tripod and the base 10 although it is understood that in use the base 10 and the bearing member 11 attached thereto is permanently affixed to the supporting tripod.

Mounted on the tripod in this manner, the composite camera mount is intended to support a camera (not shown) at the upper end thereof on the raised camera mounting platform 15. This raised platform 15 carries the captivated hand operated locking screw 16 which is provided with the threaded portion 16A adapted to engage corresponding threads in an apertured portion of the camera. The platform 15 may be provided, as shown, with recessed elastic material 18 serving as a cushion and as an anti-friction member although it is understood that the captivated screw 16 serves to firmly lock the camera to the platform 15 so as to prevent relative movement between the same. The camera thus mounted on the platform 15, may be moved in either the horizontal or azimuthal planes, or alternatively in the vertical or elevation planes using the structure now described in detail. The apparatus, as will be observed, allows simultaneous movement of the camera in both the vertical and horizontal planes simultaneously.

Figure 2:
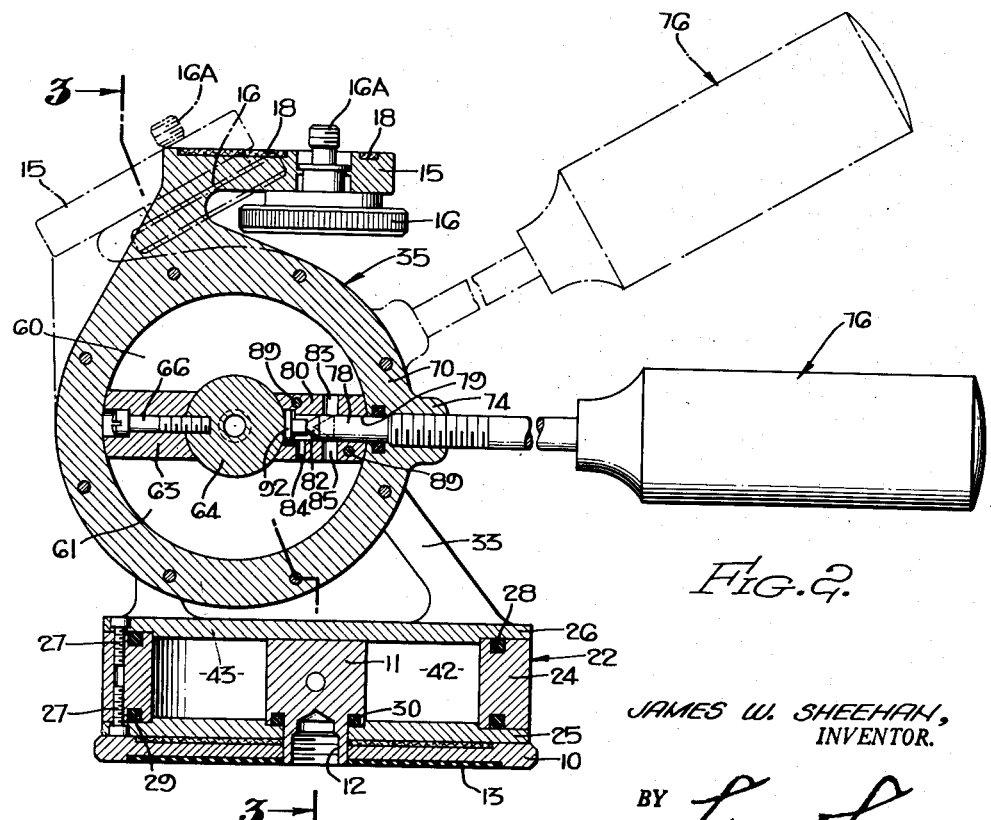
Figure 2 is a transverse sectional view taken substantially on the line 2—2 of Figure 1.
Figure 4:
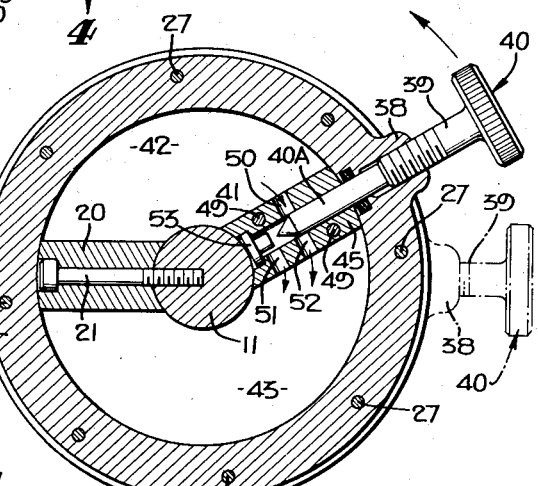
Figures 4 and 5 are sectional views taken substantially in the direction indicated by the arrows 4—4 in Figure 3, and illustrates the operating knob being moved away from the position it occupies in Figure 1 or Figure 3.
Figure 5:
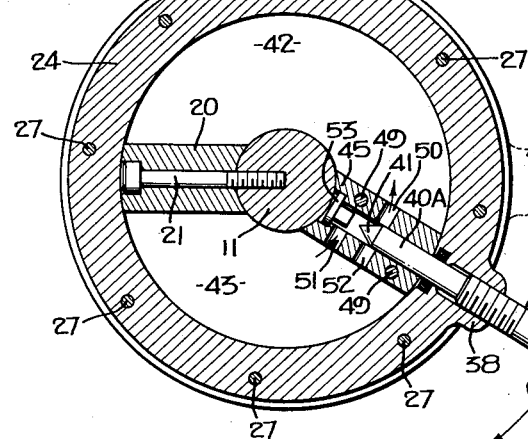

The stationary bearing member 11, as shown in Figures 4 and 5, has secured thereto the vane member 20 by means of the fastening bolt 21. The opposite ends of such vane 20 are arcuate to conform with the outer cylindrical surface of the bearing member 11 on the one hand and the inner cylindrical surface of the cylinder 22 on the other hand. This cylinder 22 is fabricated from different elements comprising the annular ring 24 and the circular end plates 25 and 26. The assemblage of elements 24, 25 and 26 being secured together by fastening bolts 27 with suitable gasket means such as, for example, recessed O rings 28 and 29 for preventing leakage. Similarly, an O ring 30 is recessed, as shown in Figure 2, in the bearing member 11 and cooperates with the bottom end plate 25 to prevent leakage at that point, while yet allowing rotation of the cylinder with respect to the stationary bearing member 11. Briefly, the top end plate 26 serves also as a supporting base for a pair of upstanding supporting arms 32 and 33 which mounts another hydraulic cylinder assembly 35 for rotation about the horizontal axis and such cylinder assembly 35 has secured thereto the aforementioned camera mounting platform 15.

The lower hydraulic cylinder assembly 22 is for the purpose of controlling movement of the camera in the horizontal or azimuthal plane whereas the upper hydraulic assembly 35 is for purposes of moving the camera in the vertical or elevational planes.

The lower cylinder 22 is provided with a tapped boss 38 which receives the threaded shank 39 of the combination operating handle and locking element 40. This shank 39 at its forward end is of reduced diameter as indicated at 40A and is tapered as indicated at 41 at its conical end to provide a needle valve. Such portion 40A of reduced diameter extends through the cylindrical bore 44 of the vane 45, such vane 45 being secured by means of fastening bolts 49 to the upper cylinder plate 26 so that, of course, such vane 45 moves with the cylinder.

It is observed that the aforementioned vane 20 and the predescribed vane 45 together with the centrally disposed bearing member 11 acts as a partition and acts to divide the interior of the cylinder 22 into two compartments, namely, compartments 42 and 43. It is understood that both of such compartments are completely filled with hydraulic fluid such as a light weight oil without any air chambers. For this purpose the vane 45 has opposite ends thereof of arcuate shape to conform respectively with the cylindrical surface of the bearing member 11 on the one hand and with the cylindrical interior base of the cylinder on the other hand.

Such vane member 45 is provided with the three transverse extending ports 50, 51, and 52, each in communication with the central bore 44. The needle valve 41 serves to control the flow of fluid through these ports in the movement of the fluid from one compartment 43 to the other compartment 42 or vice versa. This arrangement provides an adjustable metered aperture controlling the speed at which the cylinder 22 may be turned. This speed of movement is substantially independent of the turning force applied to the handle 40, once such force reaches a predetermined threshold value. This rate of movement, of course, is adjustable by screwing the handle 40 in or out of the cylinder 22.

In order to allow the movable cylinder 22 to be locked to the stationary bearing member 11 there is provided a locking element 53 which is free to move in a recessed portion of the vane 45 but which is engageable with the pointed end of the handle 40 whereby such element 53 may be pressed into engagement with the bearing member 11 to lock the cylinder to the bearing member. In such case the camera on the platform 15 is prevented from being moved in the horizontal or azimuthal plane. It is observed that this locked condition is achieved when the handle 40 is turned in its valve closing direction and only after the valve comprising the aforementioned ports and conical needle valve element 41 is substantially in its closed condition.

The upper cylinder 35 is generally of the same construction as the lower cylinder assembly as will be observed from the following detailed description of the upper cylinder.

Figure 3:
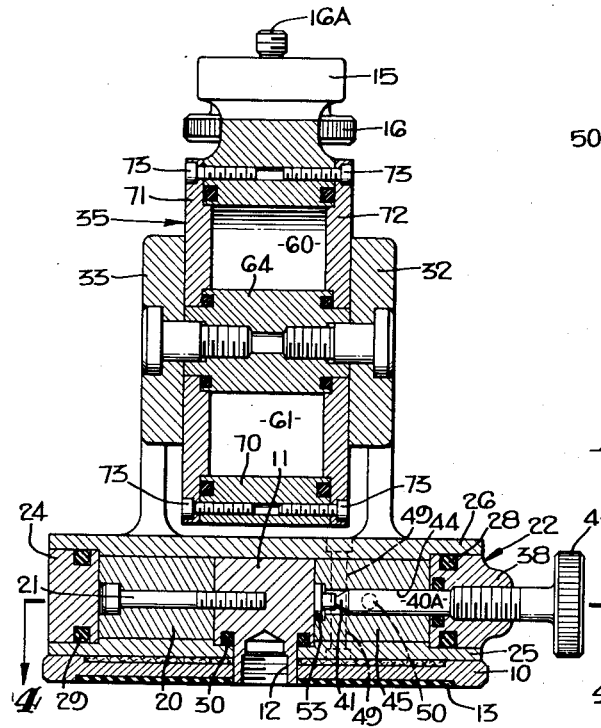
Figure 3 is a sectional view taken substantially on the line 3—3 of Figure 2.
Figure 6:
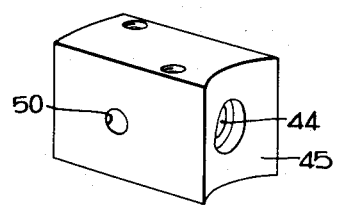
Figures 6 and 7 are perspective views looking at the vane 45 from different directions.
Figure 7:
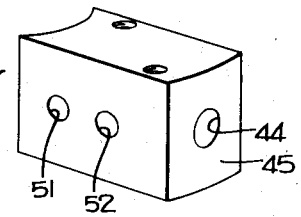

The upper cylinder assembly 35 is divided into two compartments 60 and 61 by a relatively stationary vane member 63 and the stationary bearing member 64. The bearing member 64, as shown in Figure 3, is secured to the brackets 32 and 33 such that the bearing member 64 is prevented from rotating; and as shown in Figure 2, the vane member 63 is secured to the stationary bearing member 64 by the bolt 66. This vane member 63 has opposite ends thereof of arcuate shape conforming generally on the one hand with the cylindrical surface of the bearing member 64 and, on the other hand the inner cylindrical surface of the cylinder assembly 35. Such cylinder assembly 35 comprises generally, as shown in Figure 3, the annular ring 70 and the end plates 71 and 72 which are all secured together by bolts 73 with suitable gasket means between the various elements to prevent leakage.

The cylinder member 70, of ring shape, is provided with a threaded boss 74, as shown in Figure 2 to adjustably receive the combination handle valve element and locking element 76. This member 76 is provided with a screw threaded portion engaging cooperating threads in the threaded cylinder boss 74 and is provided with a portion 78 of reduced diameter extending through the bore 79 in the vane member 80. The forward end of such member 76 is conical shape as indicated at 82 to provide a needle valve element cooperating with the transverse extending ports 83, 84, and 85 in the vane 80 so as to adjustably control the flow of fluid from one cylinder compartment 60 to the other cylinder compartment 61 or vice versa. This vane member 80 is secured to the end members 71 and 72 by fastening bolts 89. A locking element 92 is slidably received in a recessed portion of the vane member 80 for cooperation with the inner end of the element 76 whereby such element 92 may be pressed into engagement with the bearing member 64 to lock a cylinder assembly to the relatively stationary bearing member 64.

It is noted that the aforementioned platform 15 is secured, as shown in Figure 1, to the cylinder 70 so that rotation of the cylinder 70, occasioned by applying force to the handle 76 (with the needle valve element 82 in open position), results in movement of the camera on platform 15 in the elevation plane. The rate of such movement is controlled by the position of the needle valve element 82 and here again, the rate of movement may not be exceeded even though excessive turning forces, within limits, of course, are applied to the handle 76.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described for controlling the movement of a camera support which is rotatably supported on a supporting base, a stationary circular bearing member extending upwardly from said base, a hydraulic cylinder, said bearing member passing centrally through said cylinder, a vane affixed to said bearing member, said vane having opposite ends thereof conforming respectively with the circular bearing member and the circular inner wall of the cylinder, and a second vane member mounted on said cylinder and movable therewith, said second vane member having an apertured portion extending transversely therethrough, said second vane member having an apertured portion extending longitudinally therethrough, a manually operable valve member adjustably mounted on said cylinder and extending into said centrally apertured portion of said second vane member for controlling the flow of fluid through said vane member, said second vane member including a movable brake element which is engageable by said valve element and movable therewith into engagement with said bearing member.

2. The arrangement set forth in claim 1 in which said manually operable valve element serves also as a handle for moving the cylinder about the axis of said stationary bearing member.

3. In an arrangement of the character described, a centrally disposed post, a cylinder coaxially arranged around said post with said post extending therethrough, fixed partition means mounted on said post and bridging the distance between said post and the inner wall of said cylinder, second partition means mounted on said cylinder, said second partition means having an apertured portion extending transversely therethrough, said second partition means having an apertured portion extending transversely thereof, a valve element adjustably mounted on said cylinder and extending through the longitudinal apertured portion of said second partition means for controlling the flow of fluid through said second partition means, and a locking element engageable with said valve element and movable thereby into engagement with said post to lock said cylinder with respect to said post.

References Cited in the file of this patent

UNITED STATES PATENTS

| | | |
|---|---|---|
| 1,764,407 | Howell | June 17, 1930 |
| 1,898,469 | Tonsor | Feb. 21, 1933 |
| 2,272,566 | Iaube et al. | Feb. 10, 1942 |
| 2,272,567 | Laube et al. | Feb. 10, 1942 |
| 2,532,122 | Schroeder | Nov. 28, 1950 |

FOREIGN PATENTS

| | | |
|---|---|---|
| 642,172 | Germany | Mar. 1, 1937 |